United States Patent [19]

DeTora et al.

[11] Patent Number: 4,459,311

[45] Date of Patent: Jul. 10, 1984

[54] PROCESS FOR PREPARING GUM BASE

[75] Inventors: Sigismondo DeTora, Pearl River; Ronald P. D'Amelia, Hicksville, both of N.Y.

[73] Assignee: Nabisco Brands, Inc., Parsippany, N.J.

[21] Appl. No.: 455,152

[22] Filed: Jan. 3, 1983

[51] Int. Cl.³ .............................................. A23G 3/30
[52] U.S. Cl. ........................................................ 426/3
[58] Field of Search ......................................... 426/3-6

[56] References Cited

U.S. PATENT DOCUMENTS

| 3,984,574 | 10/1976 | Comollo | 426/4 |
| 3,995,064 | 11/1976 | Ehrgott et al. | 426/3 |
| 4,187,320 | 2/1980 | Koch et al. | 426/3 |
| 4,329,369 | 5/1982 | Tezuka et al. | 426/3 |
| 4,352,822 | 10/1982 | Cherukuri et al. | 426/3 |

Primary Examiner—Jeanette M. Hunter
Attorney, Agent, or Firm—R. Kornutik

[57] ABSTRACT

An improved process for producing gum base having a hard elastomer component by plasticizing the hard elastomer in the presence of a filler material prior to subjecting the hard elastomer to intensive mixing.

16 Claims, 1 Drawing Figure

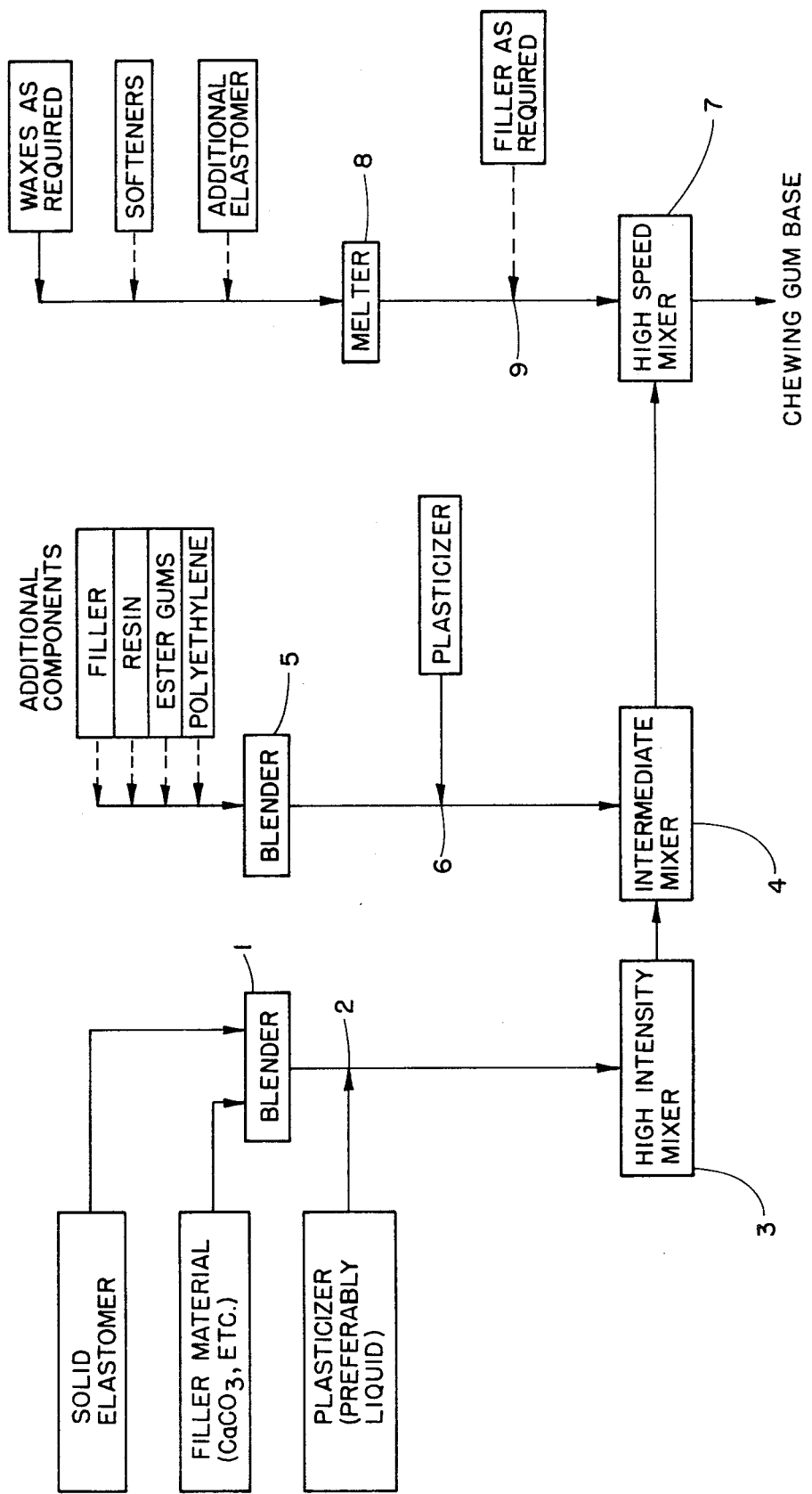

PROCESS FOR PREPARING GUM BASE

BACKGROUND OF THE INVENTION

The present invention relates to the art of producing chewing gum base and, in particular, to an improved method by which gum base may be made more efficiently at reduced energy consumption.

Chewing gums, as they are known today include a water-soluble portion which dissipates over a period of time upon chewing, and a base portion which is insoluble and inert and, thus, remains in the oral cavity throughout mastication. Flavor and sweetness are generally attributable to the water-soluble portion, while organoleptic characteristics such as texture, resiliency, film-forming capabilities, adhesivity, softness, etc. are usually attributable to the base portion. To attain desired properties in a gum product, the base is prepared with components selected for their particular organoleptic properties, their processability and for their compatibility.

As the search for new types of gum products for commercialization continues, various different base components have been sought to achieve novel attributes in the ultimate gum product. Consequently, increased demands have been placed on gum base processing in order to incorporate the newly-discovered components. Relative to very hard components, i.e., those which are resistant to local deformation whether by penetration or shear, it has been necessary to use relatively high energy methods to break down the material before mixing with other base components. Examples of such material include hard elastomer materials especially the synthetic elastomers such as polyisobutylene, styrene-butadiene copolymer, and isobutylene-isoprene copolymer. Other components which are only difficultly mixed with gum base components include but are not limited to resins such as high and low molecular weight polyvinyl acetate which produces excellent film forming properties in the resultant base and ultimate gum composition.

For example, U.S. Pat. No. 4,187,320 to Koch, et al. discloses a two-stage process for preparing chewing gum base utilizing a solid elastomer, such as butadiene-styrene copolymer, polyisobutylene and isobutylene-isoprene copolymer, wherein the solid elastomer is initially subjected to high intensity mixing under high shear conditions to obtain a substantially uniform, lump-free mass followed by the step-wise addition of an elastomer solvent to the mixer containing the masticated solid and thence the step-wise addition of an oleaginous plasticizer. High intensity mixing is conducted during the step-wise addition of both the elastomer solvent and the oleaginous plasticizer and is continued until a substantially molten, uniform mass is obtained. The second stage in the process is the step-wise addition of the remaining chewing gum base ingredients such as a hydrophobic plasticizer, a non-toxic vinyl polymer, as well as additional oleaginous plasticizer and an emulsifier. Additional optional ingredients including fillers may be added either during stage one or stage two, although, preferably, the filler is added during stage two, typically as the first stage two ingredient.

Further in this regard, U.S. Pat. No. 3,995,064 to Ehrgott, et al., describes a process for preparing a chewing gum base on a batchwise or a continuous basis which includes mixing chewing gum elastomer and solvent under high shear conditions to form a first dry solids mixture; mixing the first dry solids mixture with hydrophobic plasticizer and hydrophilic plasticizer under reduced shear conditions and increased folding action to form a second mixture; then mixing the second mixture with oleaginous plasticizer and emulsifier under rapid folding action and substantially no shear to form chewing gum base. Similarly, U.S. Pat. No. 4,329,369 to Tezuka, et al., is listed as of interest in that it shows a "one-step" method of preparing a chewing gum composition by inclusion of all necessary gum components in an intensive mixing apparatus and kneading until thoroughly mixed.

Processes such as those set forth above require, as previously explained, a high energy consuming method of preparing for/and mixing the base components. Adherence to predominantly mechanical mastication methods may well be attributable to a belief that opening up a macromolecular structure, such as that of an elastomer or resin, in any other fashion would contribute to the degradation of the very property for which it is used.

Furthermore, whether by batch method or continuous process, time is required to break the components open and for mixing them until a single relatively homogeneous gum base is attained. By the present invention, however, these problems as well as others encountered in the preparation of gum base have been to a great extent overcome.

SUMMARY OF THE INVENTION

This invention is a process for producing gum base containing a difficultly-mixed macromolecular component such as a hard elastomer by first admixing such component, preferably in particulate form, with a filler component and then subjecting the admixture to a plasticizer before introducing it to further processing such as high shear mixing, and adding further gum base components. Preferably the plasticizer is in liquid form, while the filler material can be any mineral adjuvant normally found in gum base, such as calcium carbonate ($CaCO_3$), etc.

The ratio of plasticizer to hard elastomer component, is from about 0.1:1.0 to about 3.0:1.0, but is preferably from about 0.25:1.0 to about 2.00:1.0, and most preferably is about 0.5:1.0 to about 1.0:1.0, while the ratio of filler material to hard elastomer component is from about 15.0:1.0 to about 1.0:1.0, and is preferably from about 8.0:1.0 to about 2.0:1.0, and most preferably about 3.0:1.0.

Advantageously, hard polyisobutylene elastomer can be mixed in this manner using calcium carbonate and a microcrystalline wax prior to introducing additional gum base components and undergoing further appropriate processing steps with reduced torque needed in the intensive mixing steps and a higher throughput of processed gum base. As a result, the energy requirement is reduced, resulting in the capability of increasing the throughput. Thus, the entire process is rendered more efficient than any other gum base process known to date. In fact, by use of the present invention gum base throughput can be intensively mixed at no more than about 0.32 amps per pound of product, and in most cases at less than about 0.16 amps per pound of throughput.

Moreover, since the present invention can be used with both batch and continuous processes, gum base processing systems which are in place can easily be adapted to include, the energy-saving features disclosed herein.

For a better understanding of the present invention, together with other and further objects, reference is made to the following description, taken in conjunction with the accompanying drawing, and its scope will be pointed out in the appended claims.

BRIEF DESCRIPTION OF THE DRAWING

The drawing is a schematic flow sheet showing the process of the invention. The dotted lines indicate optional additions.

DETAILED DESCRIPTION OF THE INVENTION

A typical chewing gum base is formulated from natural gums or elastomers, examples of which include natural rubber, chicle, balata, sorva, guttapercha, lechi, caspi and jelutong, and/or synthetic gums or elastomers such as polyisobutylene, isobutylene-isoprene copolymer and butadiene-styrene copolymer. Among these, the synthetic elastomers, butadiene-styrene copolymer, polyisobutylene, isobutylene-isoprene copolymer or mixtures thereof are preferred.

The elastomer of choice, preferably in particulate form, is mixed with a filler, which is usually an inorganic material such as $CaCO_3$, $MgCO_3$, $Al_2O_3$, talc and the like, by blending the elastomer and filler material in blender 1. This admixture is then subjected to a suitable plasticizer which is preferably added in the form of a liquid prior to introducing the mixture into a high intensity mixing apparatus, e.g., at point 2 of the accompanying drawing.

It has been found that oleaginous plasticizers are particularly effective for use in this inventive process to prepare elastomers for further mixing and processing. The oleaginous plasticizers include waxes such as petroleum waxes, like paraffin waxes, as well as polyethylene waxes and oleaginous materials such as cocoa butter, and hydrogenated vegetable oils. Experience to date has indicated that microcrystalline waxes, such as those sold under the Trade Names Mobilwax and Bareco wax, are particularly effective in the present invention. Other plasticizers include fatty acid esters such as n-butyl stearate, butyl sebacate, butyl benzyl sebacate, butyl oleate, oleic acid, mono-, di-, or tri-glyceryl esters of the saturated or unsaturated fatty acids of oleic acid, caprylic acid, butyric acid, capric acid, caproic acid, lauric acid, mineral oil, liquid petroleum hydrocarbons, squalane, squalene, castor oil and other ricinoleate derivatives, diethylene or propylene glycols and derivatives, tributyl acetyl citrate, tributyl citrate, lecithin, coconut oil, glyceryl tributyrate, Zn laurate, Ca stearate, propylene glycol monostearate, propylene glycol monolaurate, fatty acids, diacetyl tartaric acid esters of mono- and diglycerides of edible fat oils or edible fat forming acids, petrolatum, stearyl monoglycerides citrate, limonene, polylimonene, natural waxes, butyl lactate.

Prior to the present discovery, practice dictated that a liquid elastomer plasticizer which effectively dissociates elastomer intra- and intermolecular bonding by "opening up" the elastomer for further processing in an intensive mixer/grinder would be considered unuseable because the broken down elastomer would result in a throughput much too "thin" for processing in an intensive mixing apparatus. The present invention overcomes this problem, by inclusion of an amount of filler in the plasticized elastomer which gives body to the throughput. As a result of the combination of the plasticizer and the filler material the hard elastomer component can be "opened up" sufficiently to reduce the energy needed for processing in the intensive mixing apparatus while at the same time retaining sufficient body or consistency in the gum base throughput for purposes of effective processing.

While the present invention is not to be considered dependent or limited by any theory set forth herein, "opening up" is believed to occur by the increase of the mobility of the hard elastomer macromolecule so as to bring the bulk nearest to the fluid state. The plasticizer increases the softness, flexibility, and extensibility while decreasing the yield point, modulus of elasticity, and tensile strength of the hard elastomer component. The plasticizer serves to reduce the intermolecular forces allowing the molecules to move with respect to one another. There has been a belief extant in the art of making gum base that any external "opening up" would cause an irretrievable loss of macromolecular qualities. By use of the present invention, however, the practitioner is able to "open-up" the hard elastomer component sufficiently to facilitate efficient processing without loss of desired macromolecular characteristics in the gum base product.

Specifically, it has been found that by use of this novel process the power requirement of the high intensity mixing apparatus 3 (Baker Perkins M.P. Mixer), is reduced by fifty percent, while the speed of processing can be nearly doubled—an incredible increase in efficiency and reduction in energy consumption.

The novel process of the present invention is adapted to be carried out advantageously in batchwise or continuous manner, with the latter being preferred. After processing through the high intensity mixer, the effluent, which is a homogeneous rubber product having no undispersed elastomer particles, is transferred to an intermediate mixer 4 (such as a Reitz Mixer) where further gum components are added and mixed with the plasticized elastomer. The intermediate mixer is one which provides less of a shearing action and more of a folding action because clearances between moving surfaces are greater. Examples of base ingredients which can be added at this point, include additional filler material, resins, ester gums, and polyethylene, which are usually mixed together as in blender 5 and then plasticized as needed prior to mixing with the elastomer rope, e.g., such as at point 6 in the drawing.

Resins which might be considered for addition to the gum base include vinyl polymers such as polyvinyl acetate or partially hydrolyzed polyvinyl alcohol, vinyl acetate-vinyl laurate copolymers, ethylene vinyl acetate copolymers or mixtures thereof, while ester gums include rosin derivatives such as dimerized rosin ester, or glycerol ester of polymerized rosin or a terpene resin, such as polymers of alpha-pinene or beta-pinene. To assure compatibilization with the elastomer and with each other, a suitable plasticizer can be added to the blended ingredients. When high molecular weight, polyvinyl acetate is one of the additional base ingredients it has been found that glyceryl triacetate (triacetin) is particularly useful as an effective compatibilizer. Traditional plasticizers also contemplated for use herein are esters of rosin and hydrogenated esters of rosin, such as the glyceryl esters of hydrogenated rosin or the glyceryl esters of partially hydrogenated rosin and the like. Other unique plasticizers include glyceryl tributyrate, trimethyl citrate, benzyl benzoate, benzyl butyrate, cresyl acetate, ethyl acetate, diethyl malonate, diethyl sebacate, ethylacetoacetate, diethyl tartrate, ethyl lactate, butyl lactate, acetyl triethyl citrate, diethyl succinate, diethyl malate, lactic acid, sucrose octaacetate, diacetyl tartaric acid ester of mono- and diglycerides, stearyl mono-glyceridyl citrate, castor oil and other ricinoleate derivatives, succinylated monoglycerides, or lactylic or glyceryl lacto esters of fatty acids, alone or in combination with acetylated monoglyceride. The types of plasticizer used will of course depend on the nature of the additional components added at this point as well as the desired consistency and characteristics of the gum base.

The processed gum effluent exiting the intermediate mixer, a dough-like substance which can be stretched into a homogeneous film exhibiting no individual particles, is then fed to a final high speed mixer 7 (Identify Liffleford Mixer) into which further base components are simultaneously introduced. This rapid mixing apparatus provides essentially no shearing action but a very rapid folding action. These final groups of components normally include waxes, softeners, additional elastomer, and filler if desired. The waxes, which may consist of an additional amount of elastomer plasticizer used in preparing the elastomer, are preferably melted optionally together with softeners and additional elastomer in melter 8, after which additional filler material can optionally be added at point 9 on the drawing.

It is noted at this point that the term "plasticizer" as employed herein includes masticatory substances which function as softening agents, but that the term softeners, in fact, contemplates the same or similar substances used in a slightly different role and/or at different steps in the processing.

The various ingredients are generally employed in the following percentages by weight

| Gum Base Ingredients | Percentage by Weight of the Gum Base |
| --- | --- |
| Elastomer | 5–15% |
| Elastomer Plasticizer | 8–15% |
| Filler | 5–35% |
| Resin | 25–35% |
| Resin Plasticizer | 8–15% |
| Waxes | 0–12% |

When the base is prepared by a continuous process each group of components is preferably separately blended before being fed into the respective mixing step. However, it will be appreciated that each ingredient may be separately metered into its respective mixer without being previously blended. Furthermore, the various mixing operations carried out employing the mixers subsequent to the initial plasticization may be carried out employing a single variable mixer. In any event, all blenders and mixers are jacketed so that heat may be supplied when necessary to insure efficient mixing, particularly when starting the process.

The following examples illustrate the present invention without, however, limiting the same thereto.

EXAMPLE 1

Hard polyisobutylene particulate was fed into a blender along with $CaCO_3$ filler at a rate of 30 lbs/hour and 100 lbs/hour, respectively. The blended elastomer/filler effluent was fed at a rate of 130 lbs/hour in combination with melted microcrystalline was (Mobilwax) which, in turn, was fed at 14.2 lbs/hour into a high intensity mixing apparatus (an M.P. Mixer) operating at 100 r.p.m.

The power requirement of the high intensity mixer during this operation was less than 25 amps, and the operating temperature of the mixer was 340° F. This is to be contrasted with an energy requirement of no less than 55 amps at 100 r.p.m. necessary without the elastomer plasticizer as well as an operating temperature of at least about 400° F. Consequently, the high intensity mixer can be operated at between about 60 and 100 r.p.m. rather than the usual rate of 50 r.p.m. or below, resulting in a significantly higher volume flow of gum base throughput.

The effluent exiting from the high intensity mixer was found to be a smooth homogeneous rope of rubber base material having no particles or discontinuities commonly referred to as "eyes".

EXAMPLE 2

Another gum base was prepared as in Example 1 except that talc was used as the filler material at a rate of 99 lbs/hour while the melted microcrystalline wax (Mobilwax) was fed at a rate of 21.8 lbs/hour into the high intensity mixing apparatus (M.P. Mixer) which was run at 100 r.p.m.

The power requirement of the high intensity mixer was between 15 and 17 amps throughout the mixing operation, while the operating temperature of the mixer was no more than about 340° F. The resulting effluent was smooth and free of discontinuities and/or unwanted rubbery particles.

EXAMPLE 3

In this example hard polyisobutylene particulate was fed into a blender at 30 lbs/hour while talc was added at a rate of 315 lbs/hour. This blended elastomer/filler was fed in combination with solid polyethyelene microcrystalline wax at 22.5 lbs/hour and melted Mobilwax at 31 lbs/hour into a high intensity mixer operating at 100 r.p.m.

A very acceptable gum base rope was produced as in the previous examples drawing less than 40 amps. during the entire process.

SBR EXAMPLES

In order to demonstrate the effectiveness of the present invention utilizing styrene-butadiene rubber as the hard elastomer, the following examples were prepared comparing the present process with SBR processes known to date in which the high intensity mixer could not be run at a rate greater than 60 r.p.m.

EXAMPLE 4

In this example SBR was introduced into a blender along with $CaCO_3$ filler at a rate of 100 lbs/hour and 400 lbs/hour, respectively. The elastomer/filler blend was fed in combination with solid Bareco wax fed at a rate of 21.8 lbs/hour into a high intensity mixer operated at 100 r.p.m.

A soft extruded gum base rope was produced utilizing no more than about 40 amps. This was contrasted to previous experience in which intensive mixing of SBR could not be conducted at more than about 60 r.p.m.

EXAMPLE 5

A final example was prepared using SBR at a feed rate of 92 lbs/hour along with $CaCO_3$ at 149 lbs/hour.

The plasticizer, n-butyl stearate, was combined with the filler/elastomer combination at a rate of 60 lbs/hour into the high intensity mixer operated at 100 r.p.m. A good quality extrudate was produced using only 25 amps during peak operation.

These examples conclusively demonstrate the efficiency provided by the present invention without loss of product quality.

Thus while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

I claim:

1. A process for producing gum base having a hard elastomer component comprising the steps of:
   (a) blending only filler material with hard elastomer wherein the filler material is added in a weight ratio of about 15.0:1.0 to about 1.0:1.0 of filler material to hard elastomer, respectively, which is effective to give the hard elastomer sufficient body for further processing; and
   (b) mixing a plasticizing agent with said filler-hard elastomer blend in a weight ratio of from about 0.1:1.0 to about 3.0:1.0 of plasticizing agent to hard elastomer, respectively, to open up said elastomer;
   wherein steps (a) and (b) are completed before subjecting said plasticized blend to high intensity mixing and before adding the remainder of desired gum base components in subsequent mixing steps and the power requirement for the high intensity mixing is less than about 0.32 amps per pound of throughput at 100 r.p.m.

2. The process of claim 1 wherein said hard elastomer is in particulate form.

3. The process of claim 1 wherein said hard elastomer is selected from the group consisting of polyisobutylene, isoprene-isobutylene copolymer, and styrene-butadiene copolymer.

4. The process of claim 1 wherein said plasticizing agent is in liquid form.

5. The process of claim 1 wherein said plasticizing agent is selected from the group consisting of n-butyl stearate, oleic acid; mono-, di-, or tri-glyceryl esters of the saturated or unsaturated fatty acids of oleic acid, caprylic acid, butyric acid, capric acid, caproic acid, lauric acid, mineral oil, liquid petroleum hydrocarbons, squalane, squalene, castor oil and other ricinoleate derivatives, diethylene or propylene glycols and derivatives, tributyl acetyl citrate, tributyl citrate, lecithin, coconut oil, glyceryl tributyrate, Zn laurate, Ca stearate, propylene glycol monostearate, propylene glycol monolaurate, fatty acids, butyl sebacate, butyl benzyl sebacate, diacetyl tartaric acid esters of mono- and di-glycerides of edible fat oils or edible fat forming acids, petrolatum, stearyl monoglycerides citrate, limonene, polylimonene, natural waxes, butyl lactate, and butyl oleate.

6. The process of claim 1 wherein said elastomer is polyisobutylene and said plasticizing agent is liquid microcrystalline wax.

7. The process of claim 1 wherein said elastomer is styrene-butadiene copolymer and said plasticizer is n-butyl stearate.

8. The process of claim 1 wherein said filler material is selected from the group consisting of $CaCO_3$, $MgCO_3$, $Al_2O_3$ and talc.

9. The process of claim 8 wherein said filler material is $CaCO_3$.

10. The process of claim 1 wherein said ratio is from about 0.25:1.0 to about 2.00:1.0.

11. The process of claim 10 wherein said ratio is from about 0.5:1.0 to about 1.0:1.0.

12. The process of claim 1 wherein said ratio is from about 8.0:1.0 to about 2.0:1.0.

13. The process of claim 12 wherein said ratio is about 3.0:1.0.

14. The process of claim 1 which further comprises a continuous process wherein additional gum base components are included by a subsequent intermediate intensity mixing step, and then a high speed mixing step.

15. The process of claim 1 wherein said high intensive mixing apparatus is run at from about 60 to about 100 r.p.m. with low power requirement.

16. The process of claim 15 wherein said power requirement is not more than about 0.16 amps.

* * * * *